(12) United States Patent
Tanaka

(10) Patent No.: US 6,510,301 B2
(45) Date of Patent: Jan. 21, 2003

(54) IMAGE FORMING APPARATUS, INCLUDING A LOCK UNIT FOR PREVENTING A READING UNIT AND A PLATEN COVER FROM BEING OPENED SIMULTANEOUSLY

(75) Inventor: Makoto Tanaka, Nagaokakyo (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/996,853

(22) Filed: Nov. 19, 2001

(65) Prior Publication Data

US 2002/0061212 A1 May 23, 2002

(30) Foreign Application Priority Data

Nov. 20, 2000 (JP) .................................... 2000-352162

(51) Int. Cl.$^7$ ............................................... G03G 15/00
(52) U.S. Cl. ....................................... 399/125; 399/379
(58) Field of Search ................................. 399/377, 379, 399/380, 125, 118, 107; 358/494, 496, 497; 355/75

(56) References Cited

U.S. PATENT DOCUMENTS 4,814,817 A * 3/1989 Nishijima et al. .......... 399/125
5,162,846 A * 11/1992 Cahill ........................ 399/125
5,206,681 A * 4/1993 Otomo et al. ........... 399/125 X
5,913,095 A * 6/1999 Takashima et al. ......... 399/125

FOREIGN PATENT DOCUMENTS

JP          05-289429          11/1993

* cited by examiner

Primary Examiner—Sophia S. Chen
(74) Attorney, Agent, or Firm—Hogan & Hartson, LLP

(57) ABSTRACT

An image forming machine provided with an image recording unit, a reading unit on the image recording unit, and a platen cover. The reading unit and the platen cover can be opened and closed. The image forming machine includes a first lock unit for enabling the platen cover to be locked to the reading unit, with the platen cover closed, and a second lock unit for interlocking with the first lock unit and releasing connection between the reading unit and the image recording unit. When the reading unit is opened upwards relative to the image recording unit to exchange a process unit of the image recording unit or eliminate jam in the image recording unit, only in the state where the platen cover is locked to the reading unit, the reading unit can be opened upwards.

20 Claims, 11 Drawing Sheets

IMAGE FORMING APPARATUS, INCLUDING A LOCK UNIT FOR PREVENTING A READING UNIT AND A PLATEN COVER FROM BEING OPENED SIMULTANEOUSLY

CROSS REFERENCES TO RELATED APPLICATIONS

This application claims priority under 35 USC 119 of Japanese Patent Application No. 2000-352162 filed in JPO on Nov. 20, 2000, the entire disclosure of which is incorporated herein by reference. Japanese Patent Application No. 2000-352162 claims internal priority of Japanese Ok; Patent Application No. 11-366630 filed in JPO on Dec. 24, 1999.

BACKGROUND OF THE INVENTION

1. Field of the Invention

The present invention relates to an image forming apparatus in which a reading unit is openably and closably provided on an image recording unit, and a platen cover is openably and closably provided on the reading unit.

2. Description of the Related Art

An image forming apparatus is provided with a reading unit on an.image recording unit, and the discharge tray storing the reading medium discharged from the image recording unit is provided in the space formed between the image recording unit and the reading unit. Moreover, the reading unit can be opened relative to the image recording unit in order to exchange a toner cartridge in the image recording unit and to eliminate the paper jam in the image recording unit. Further, a document is placed on platen glass provided on the upper surface of the image recording unit by opening the platen cover, so that the document is scanned.

This image forming apparatus is used as the electrophotographic copier and facsimile device. Users scan a document by lifting the platen cover, placing the document face down onto the platen glass, and then closing the platen cover. Then users typically press a start button in order to scan the document. The image data of the document scanned by the reading unit is transmitted to the image recording unit and the record is done on the recording paper. Additionally, when the paper jam is generated in the image recording unit or the toner cartridge is exchanged, the recording unit is opened using the hinge of the image recording unit as a supporting point and the maintenance is done. However, when the platen cover is parted even a little or the external power is added, the platen cover is opened widely and crashed into the wall which is in the opening direction, so that there is a possibility that the platen cover and the wall are broken. In particular, the platen cover, having the heavy load like the automatic document feeder (ADF), opens exponentially by the weight of the ADF, which may be broken with loud sound. Further, the platen cover having the heavy load like the ADF is provided with the assistant means like the spring for energizing to the opening direction in order for users to open the platen cover easily. However, this assistant means makes the platen cover open with vigor and the ADF provided in the platen cover crashes into the wall, so that the possibility of the breakage becomes higher.

SUMMARY OF THE INVENTION

It is an object of the present invention to prevent the above-mentioned problems and to provide an image forming apparatus including a lock unit for preventing a reading unit and a platen cover from being opened simultaneously.

According to the first aspect of the present invention, there is provided an image forming apparatus including a first lock unit for enabling the platen cover to be locked to the reading unit in the state in which the platen cover is closed, and a second lock unit for releasing the combination between the reading unit and the main body of the apparatus by interlocking with the first lock unit. Therefore, at the time of exchanging a process unit provided on the main body of the apparatus or swinging the reading unit for eliminating the recording paper jam in the reading part, the platen cover is locked to the reading unit, and the platen cover cannot be opened with the platen cover widely swung, so that the breakage of the platen cover can be prevented.

According to the second aspect of the present invention, the first lock unit is operated to the first position where the platen cover is locked to the reading unit and to the second position where the second lock unit is activated. Since the first lock unit causes interlocking so as to carry out the operation of releasing the lock between the main body of the apparatus and the reading unit by fixing the platen cover, one operation of the first lock unit make it possible to perform the release easily.

According to the third aspect of the present invention, a first lock unit includes the first lock member rotataby provided on the platen cover, and the lever for rotating the first lock member. Since the lever to the first lock member and an operation member corresponding with the second lock unit are provided on the first lock unit, the structure of the mechanism can be simpler.

According to the forth aspect of the present invention, the second lock unit restraining the first lock unit includes the link whose one end is rotatably supported by a shaft and which has an engagement part on the other end thereof for engaging the main body of the apparatus. The first lock member contacts against the link so as to release the engagement between the main body of the apparatus and the reading unit. Moreover, since the platen cover can be opened only in the state in which the reading unit is closed to the main body of the apparatus, the platen cover can be retained safely.

According to the fifth aspect of the present invention, there is provided an image forming apparatus including the operation lever for moving the first lock unit to the first position and the second position, and the stopper for stopping the operation lever, at the first position, which has been operated to the second position. The first lock unit has the first lock member which is freely rotatably installed on the reading unit and which is interlocked by the operation of the operation lever, and the engagement part of the platen cover for engaging with the first lock member. Moreover, the engagement of the reading unit and the platen cover is retained while working such as maintenance is being conducted with the recording part exposed, and the opening and closing of the platen cover can be permitted only in the state in which the reading unit precisely fixed to the main body of the apparatus.

According to the sixth aspect of the present invention, a second lock unit includes the second lock member which is installed on the reading unit and which interlocks with the first lock member through a link mechanism, and an engagement member provided on the main body of the apparatus for engaging with the second lock member. Therefore, the second lock unit is activated by the first lock unit, and the opening and closing of the reading unit relative to the main body of the apparatus becomes possible.

According to the seventh aspect of the present invention, there is provided an image forming apparatus including a stopper releasing member for releasing the engagement between the operation lever and the lever stopper that stops the operation lever at the first position when closing the reading unit provided on the upper part of the main body of the image forming apparatus. Moreover, the first lock member that was in the waiting position can be released from the stopped state through the interlocking mechanism by releasing the lever stopper locking the operation lever when closing the reading unit to the main body of the apparatus. Therefore, the state in which the platen cover is openable can be set easily.

Additional objects, aspects, benefits and advantages of the present invention will become apparent to those skilled in the art to which the present invention pertains from the subsequent detailed description and the appended claims, taken in conjunction with the accompanying drawings.

DETAILED DESCRIPTION OF THE INVENTION

1. First Embodiment

Figure 1:
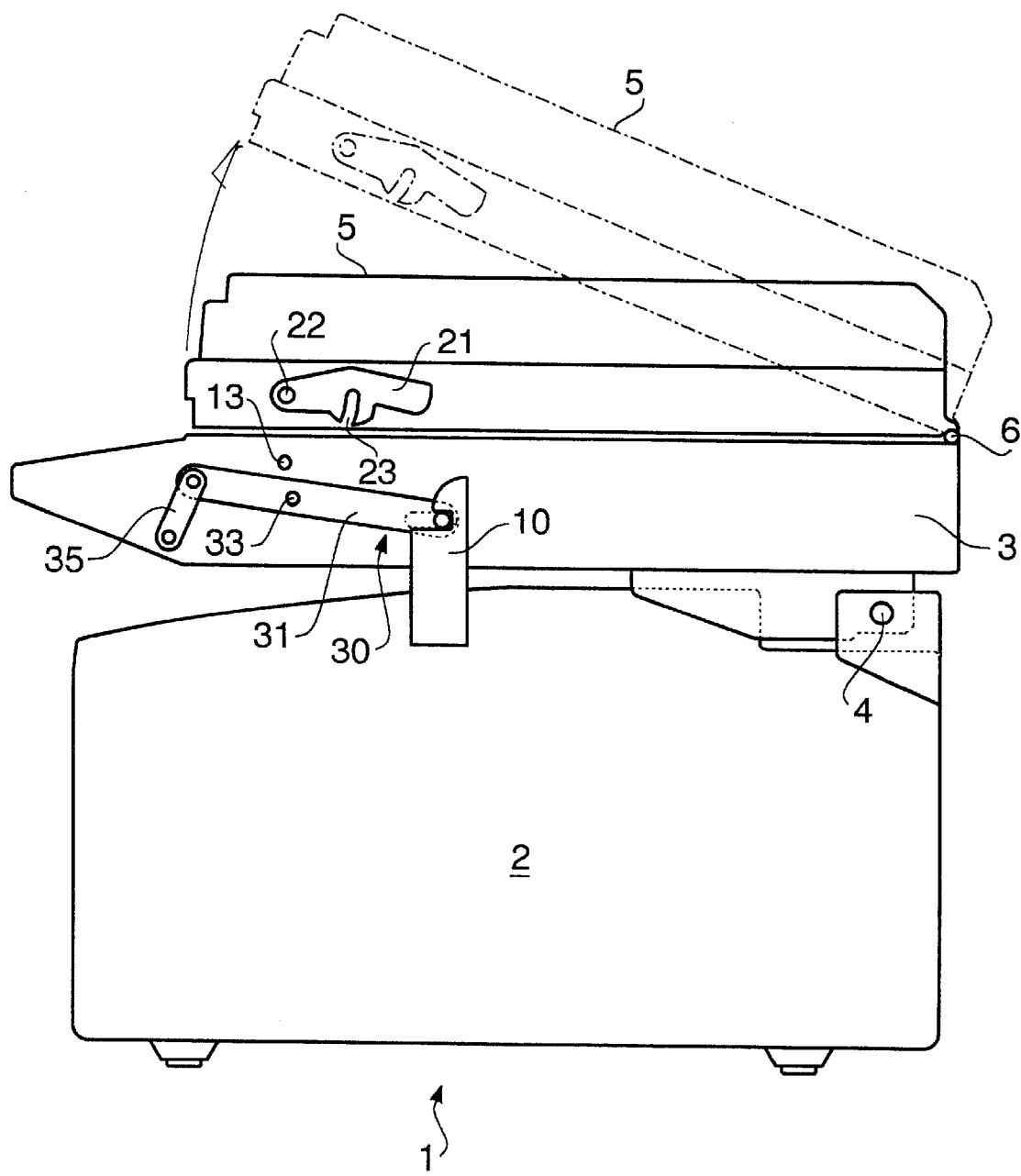
FIG. 1 is a side view showing structure of an image forming apparatus according to an embodiment of the present invention.

The structure of an image forming apparatus as an embodiment according to the present invention will be described with reference to the accompanying drawings. In each of the drawings mentioned below, the structure of each mechanism is illustrated by looking at the image forming apparatus from the side thereof As shown in FIG. 1, the image forming apparatus 1 includes an image recording unit 2 in the lower part, a reading unit 3 which is located on the image recording unit and can be opened and closed via a hinge 4, and a platen cover which can be opened and closed relative to the reading unit 3 via a hinge G. The image recording unit 2 is constructed as a device that can perform recording on recording medium by using an electrophotographic method. The image recording unit 2, however, can be also composed by arranging a copy generating mechanism using an ink-jet method or other methods. The reading unit 3 can be provided with a flatbed scanner (FBS) which scans the image of a document placed on the platen and pressured by the platen cover 5, and provided with an automatic document feeder (ADF). A scanning device movable along the undersurface of the platen is arranged like a conventional image reading device used generally. If the apparatus is heavy when providing two kinds of document scanning mechanisms, the structure described below acts effectively. Moreover, the image data of a document scanned by the reading unit 3 whose format is arbitrary is transmitted to the image recording unit 2, and is recorded on a sheet.

In a example of FIG. 1, the image forming apparatus is shown in the state in which the reading unit 3 and the platen cover 5 are closed relative to the image recording unit 2. In the state in which the reading unit 3 is closed relative to the image recording unit 2, the reading unit 3 is fixed and retained relative to the image recording unit 2 by a second lock unit 30, and only the platen cover 5 can be opened via the hinge 6 as shown in the imaginary line (the dashed line) FIG. 1. A document is set against the platen disposed on the upper surface of the reading unit 3, and recording is carried out on recording medium by a recording part (not shown) of the recording unit 2 while reading of an image is being carried out. Moreover, also when using the ADF function, the image reading of some document sheets can be conducted by using the conventional and known ADF function. In addition, the platen cover can be equipped with the cover member to the FBS function and equipped with all of the ADF function. In this embodiment, the weight of the platen cover 5 becomes heavier due to the ADF function, but the present invention is not particularly focused on the structure of the ADF. Accordingly, the description of the ADF will be omitted.

Figure 2:
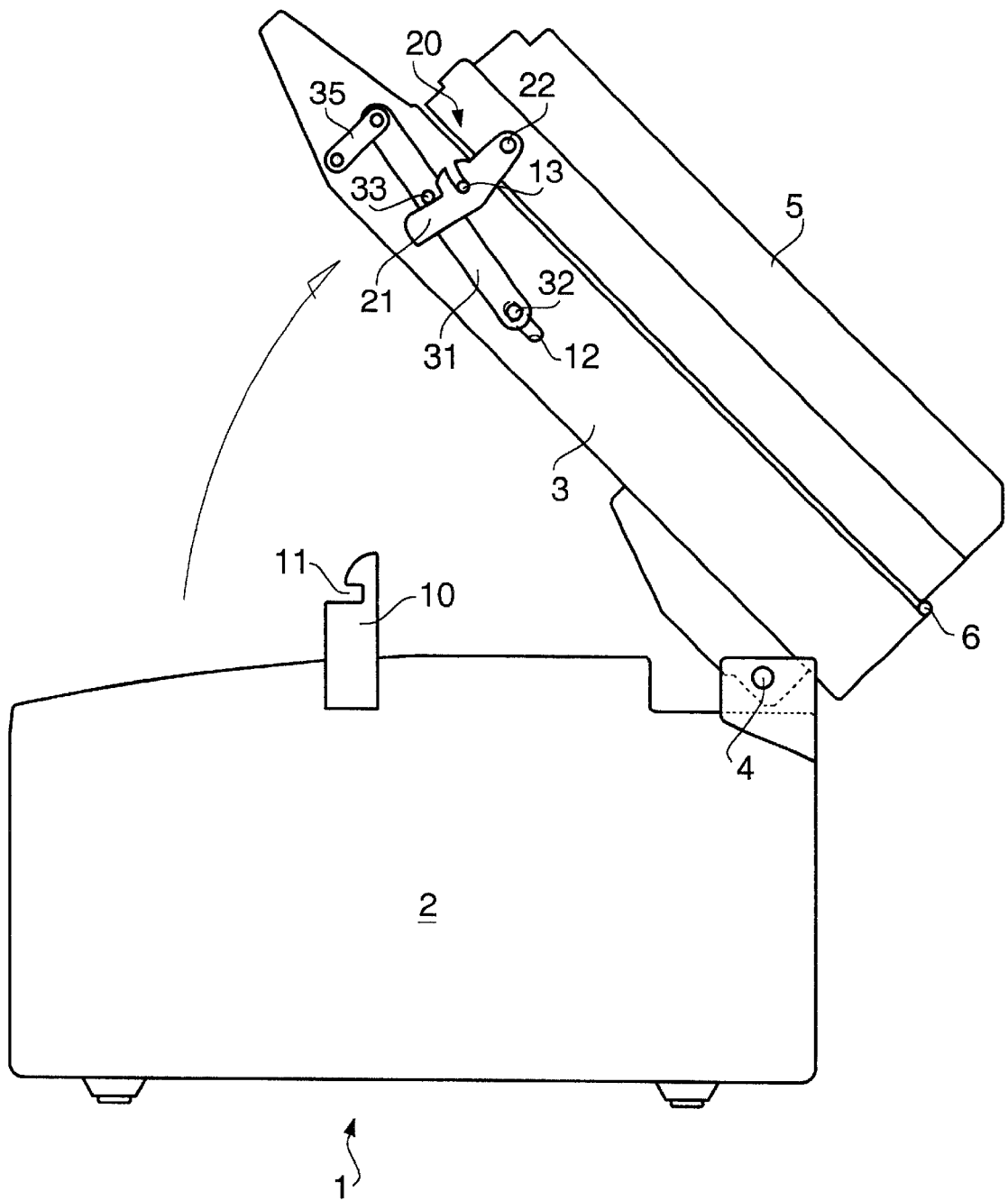
FIG. 2 is a side view showing the image forming apparatus of FIG. 1 with a reading unit opened.

In an example of FIG. 2, illustrated is the case in which the platen cover 5 is fixed relative to the reading unit 3 by activating a first lock unit 20, and the reading unit 3 and the platen cover 5 can be opened integrally relative to the image recording unit 2 via the hinge 4. The reading unit 3 is opened when the exchange of the process cartridge, the jam handling of the recording paper in the recording part, and the maintenance of the image recording unit 2 or the like are conducted. The platen cover 5 is fixed and retained to the reading unit 3 when opening the reading unit 3. The first lock unit 20 is used for fixing and retaining the platen cover 5 to the reading unit 3 and for enabling the reading unit 3 to be opened freely from the image recording unit 2.

Figure 3:
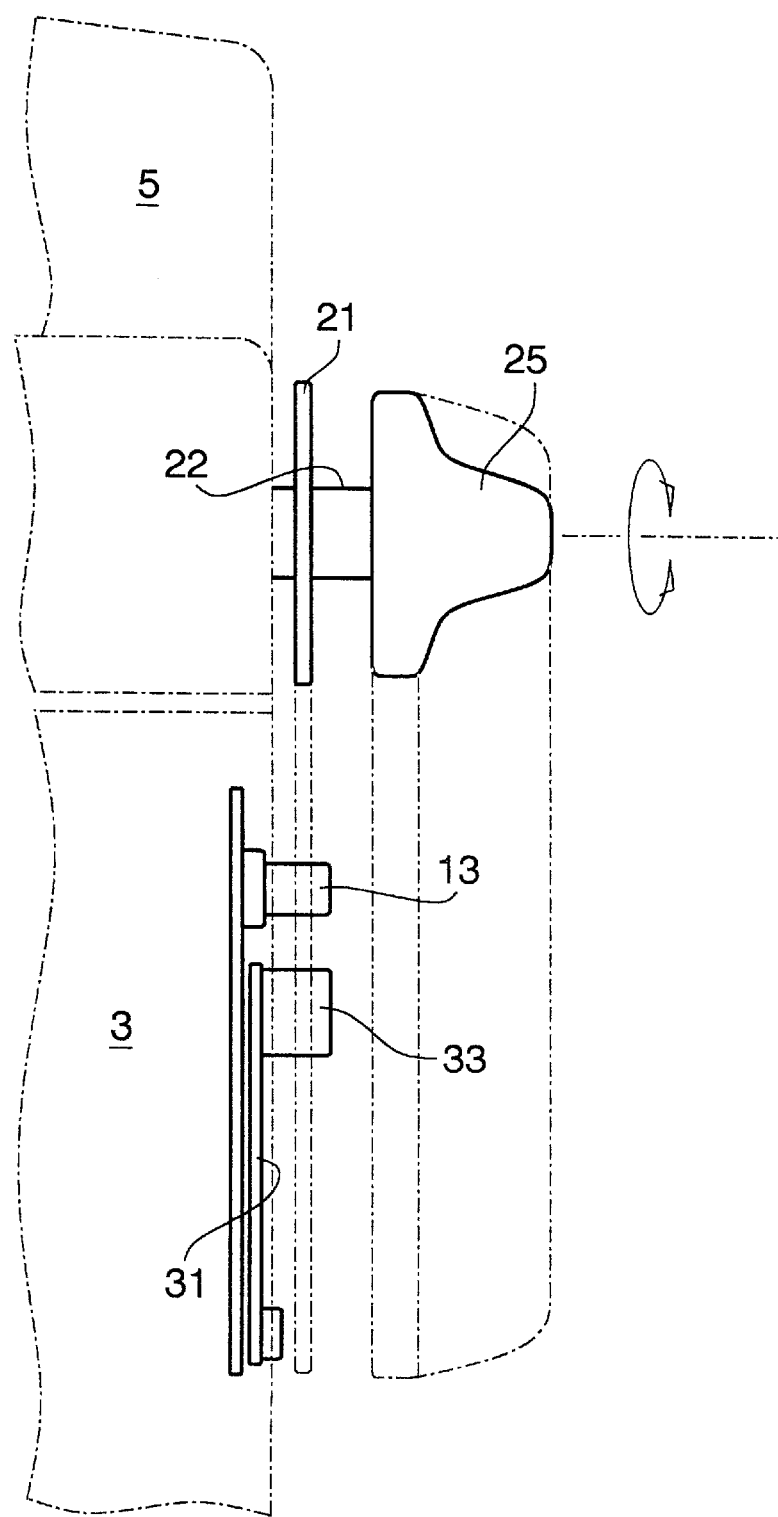
FIG. 3 is a front view showing a lock unit provided on the image forming apparatus of FIG. 1.

As shown in FIG.3, a swinging lever 21 used as an operational lever of the first lock unit is swung by a handle 25 provided on a support shaft 22. This handle 25, omitted in FIGS. 1 and 2, is arranged approximately in parallel relationship with the swinging lever 21. In FIG. 3, the handle 25 and the swinging lever 21 indicated by the solid line face in a horizontal direction. By moving the handle 25 from a position indicated by the solid lines in FIGS. 3 and 4 to a position indicated by the dashed lines in FIGS. 3 and 4, the swinging lever 21 is swung between the position shown in FIG. 1 and the position shown in FIG. 2, and it is possible to carry out the operations of fixing the platen cover to the reading unit 3, fixing the reading unit to the image recording unit 2, and releasing these units from engaging states.

Figure 4:
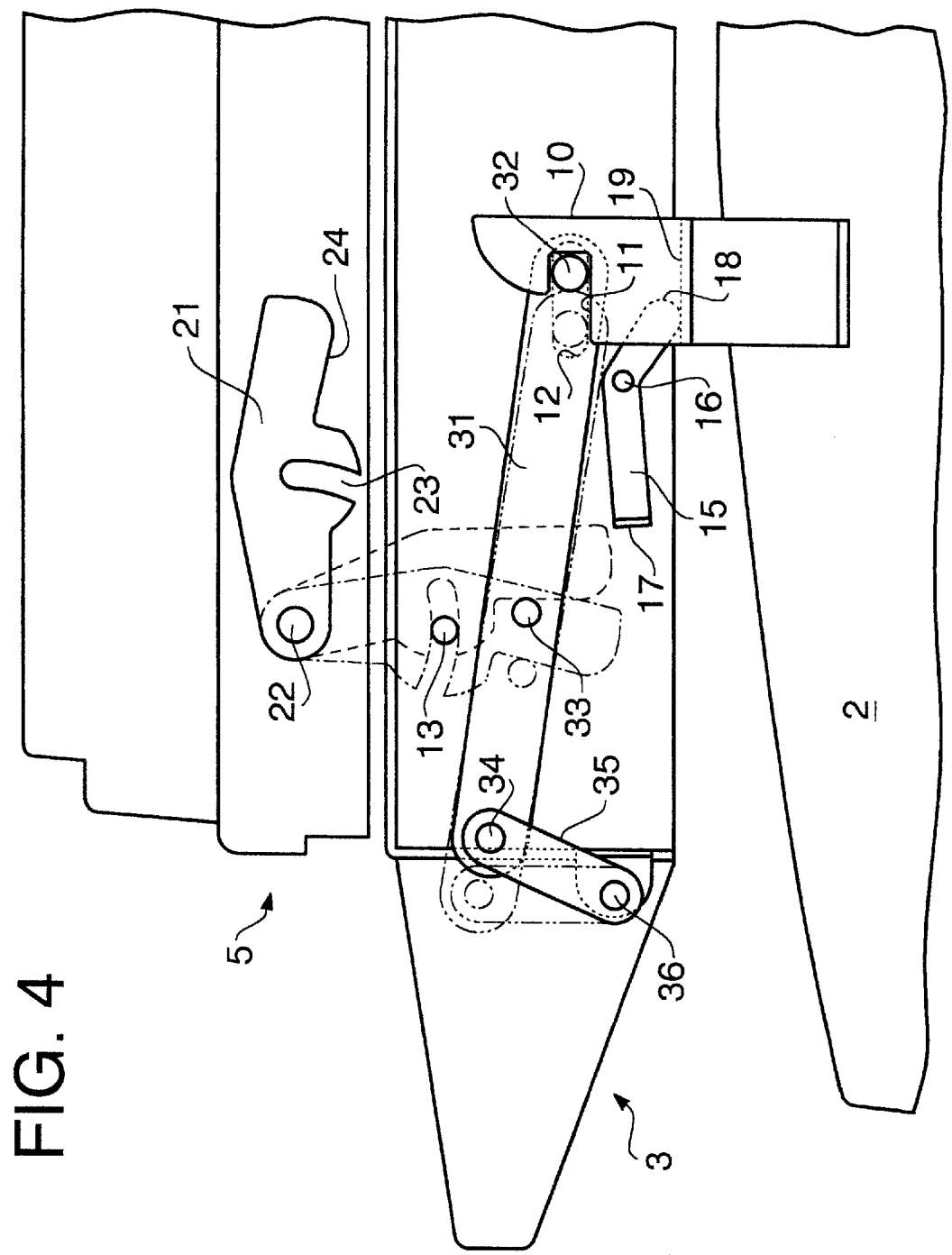
FIG. 4 is a side view showing structure of the lock unit of FIG. 3.

The structure of the first lock unit 20 and the second lock unit 30 is composed as shown in FIG. 4. A body fixed hook 10 corresponding with the lock unit is provided on the body of the image recording unit 2 such that the body fixed hook protrudes upwards. A lateral engaging concave groove 11 is formed on the body fixed hook 10 so as to have a predetermined depth. Moreover, an engaging member 19 with which a back end part of a stop lever 15 contacts is arranged so as to correspond to a predetermined position of the body fixed hook 10. When the reading unit 3 is closed, the stop lever 15 contacts with the engaging member, and therefore the stop lever 15 is swung counterclockwise with support shaft 16 functioning as a center. As a result, an engaging state of the stop lever 15 against the swinging lever 21 and a lateral link 31 is released. In this manner, the operation of releasing the locking state is carried out.

The swinging lever 21 is installed on the platen cover 5 that can be opened and closed relative to the reading unit 3 such that the swinging lever 21 can swing via the support shaft 22. The swinging lever is composed so as to enable the first lock unit to be operated by swing the swinging lever 21 by rotating the handle shown in FIG. 3 and enable the operation of releasing the lock. The swinging lever 21 is provided with an arc-shaped pin engagement groove 23 whose center is the support shaft 22 and which has a predetermined depth. A push surface 24 is formed, on the swinging lever 21, under the arc-shaped pin engagement groove 23. When the first lock unit is operated, the pin engagement groove 23 is engaged with a body fixed pin 13 installed on the reading unit 3, and a link pin, which will be described below, is pushed by the push surface 24 to move the lateral link 31.

Figure 5:
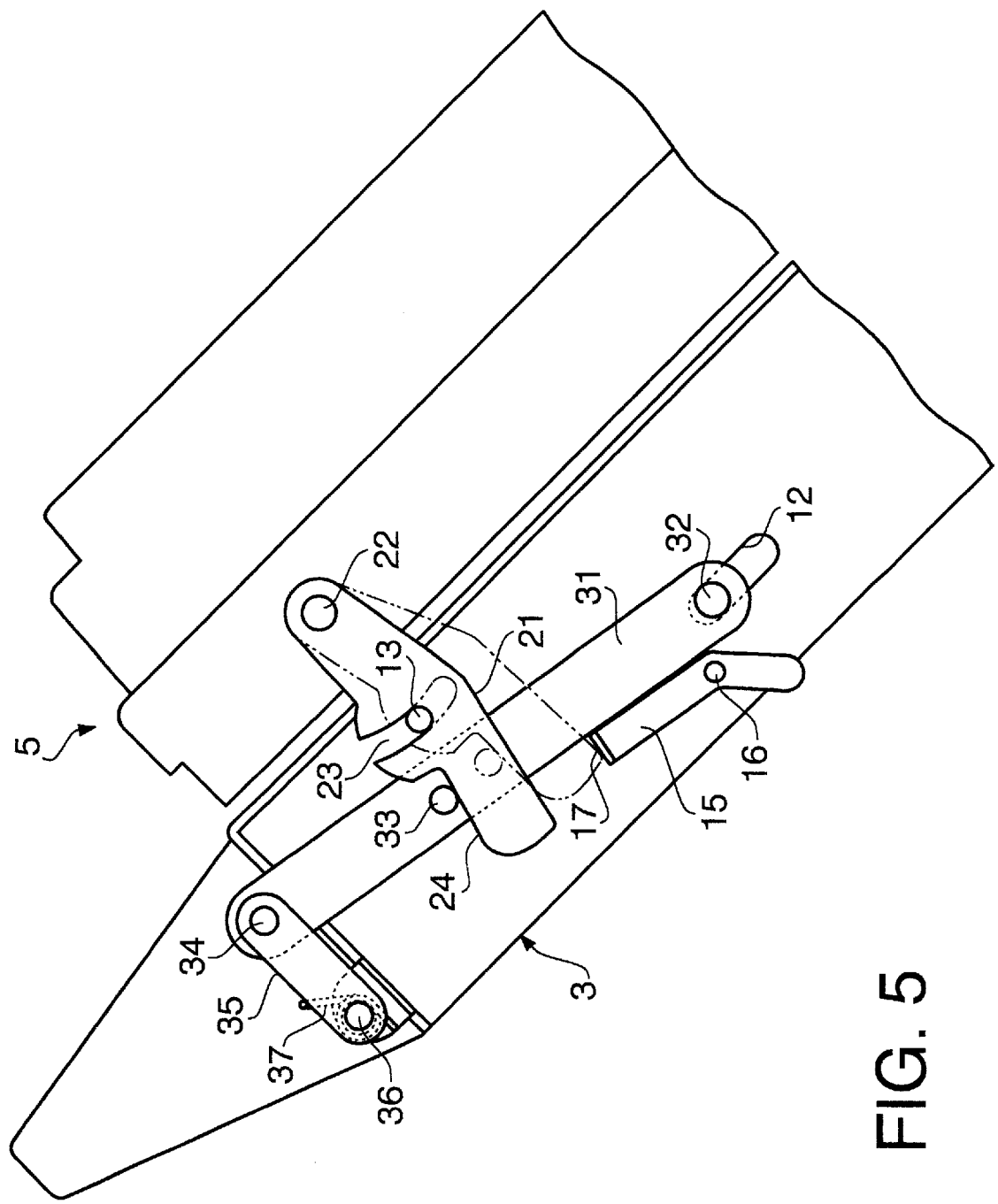
FIGS. 5 is a side view showing position relationship of a first lock unit when the reading unit is opened.

The lateral link 31 including a guide pin 32 which is located at the end part of the lateral link 31 and is guided by a body guide groove 12 is installed on the reading unit 3 via a connecting pin 34 which connects a longitudinal link 35 supported by a fixed shaft 36. The link pin 33 is installed, at a predetermined position, on the lateral link 31 so as to protrude. Furthermore, an urging member 37 (shown in FIG. 5) like the torsion spring for urging the longitudinal link 35 to move clockwise with the fixed shaft 36 functioning as a center is provided on the fixed shaft 36 as shown in FIG. 5. The lateral link 31 is urged to move in a right direction of FIG. 5 by the urging member 37. Therefore, the guide pin 32, provided at the end part of the lateral link 31 and guided by the body guide groove 12, is urged to move in a direction of engaging the engaging concave groove 11 of the body fixed hook 10. Moreover, in the state in which the link pin 33 is not pushed by the swinging lever 21, the second lock unit 30 shown in FIG. 1 is set such that the guide pin 32 is inserted into the engaging concave groove 11 of the body fixed hook 10 and the reading unit 3 is fixed and retained relative to the image recording unit 2.

Moreover, in an example of FIG. 4, as the swinging lever 21 provided on the platen cover 5 is swung from the position of the solid line to the position indicated by the imaginary line (the dashed line), the pin engagement groove 23 of the swinging lever 21 engages the body fixing pin 13 of the reading unit 3, and the push surface 24 pushes the link pin 33 of the lateral link 31 to move the lateral link 31 to the left side of FIG. 4. By this operation of moving the lateral link 31, the longitudinal link 35 is swung counterclockwise with the fixed shaft 36 functioning as a center, and thereby the operation of releasing the guide pin 32 from the engaging concave groove 11 of the body fixed hook 10, resulting in releasing of engaging state of the reading unit 3. In other words, in the example of FIG. 4, the second lock unit is operated via the first lock unit, and the operation of releasing the lock is carried out by swinging the swinging lever 21 clockwise. In addition, the predetermined depth of the pin engagement groove 23 is determined such that the engaging state of the reading unit 3 to the image recording unit 2 is released by pushing the link pin 33 of the lateral link 31 while the platen cover 5 is locked to the reading unit 3 on the image recording unit 2.

In the state in which the operation of releasing the lock in the second lock unit has been carried out, since the reading unit 3 is fixed and retained by the platen cover 5 by means of the swinging lever 21, the reading unit 3 can be opened relative to the image recording unit 2 in the manner shown in FIG. 2. When the reading unit 3 is opened, each component is positioned as shown in FIG. 5, but a tip member 17 of the stop lever 15 is positioned behind the push surface 24 of the swinging lever 21 for locking and retaining the platen cover 5 to the reading unit 3. Accordingly, the swinging lever 21 is prevented from swinging counterclockwise further than a position indicated by the imaginary line (the dashed line), and thereby it is possible to maintain this locking state even when the reading unit 3 is opened and closed.

Additionally, urging means like a spring is installed on the support shaft 16 of the stop lever 15, so that the lever 15 can be urged clockwise. Therefore, with the above-mentioned structure in which the tip member 17 comes to protrude toward the back surface of the swinging lever 21 when the reading unit 3 is swung to release the back end part 18 from the engaging member, it is possible to automatically carry out the operations of engaging the swinging lever 21 with the groove 23 and releasing the engagement of the swinging lever in accordance with the opening and closing of the reading unit 3.

In the state shown in FIG. 5, the state in which the swinging lever 21 is not released from the lock can be maintained even when the swinging lever 21 provided on the platen cover 5 releases the engagement with the image recording unit 2 by pushing the link pin 33 of the reading unit 3 and the reading unit 3 is swung in an opening direction. Moreover, the tip member 17 of the stop lever 15 is positioned to the swinging lever 21 and the lateral link 31 may be moved within the range of the guide groove 12. The tip member 17, however, limits the swing of the swinging lever 21 such that the groove 23 is not disconnect from the pin 13. Therefore, it is possible to retain the state in which the platen cover 5 is engaged with, and held by, the recording unit 3, and to prevent this state from being released unintentionally by some kind of force.

In case of closing the reading unit 3 from the state in FIG. 5, as shown in FIG. 4, the back end part 18 of the stop lever 15 is contacted against the engaging member 19 and the stop lever 15 is swung in a counterclockwise direction with the support shaft 16 functioning as a center. Therefore, the swinging lever 21 released from the fixed state made by the stop lever 15 becomes able to swing in a counterclockwise direction with the support shaft 22 functioning as a center. In addition to that, the push of the link pin 33 of the lateral link 31 is released, and thereby the urging member 37 causes the guide pin 32 of the lateral link 31 to move toward the right side in FIG. 5 along the body guide groove 12. Since the guide pin 32 is inserted into the engaging concave groove 11 of the body fixed hook 10, the reading unit 3 is held in the state in which the reading unit 3 cannot be opened and closed relative to the image recording unit 2. Therefore, the swinging lever 21 is released from the fixed state by the stop lever 15, and can swing counterclockwise direction with the support shaft 22 functioning as a center. The swinging lever 21 is rotated so as to be in parallel with the platen cover 5, so that the combination state of the platen cover 5 and the reading unit 3 is released.

2. Second Embodiment

In addition to the embodiment shown in FIGS. 1 to 5, the lock unit shown in FIGS. 6 to 11 can be constructed according to another embodiment of the present invention. In this embodiment, the reading unit 3 is provided so as, to enable the reading unit 3 to be opened and closed, via a hinge 8, relative to the body of the image forming apparatus including the image recording unit 2. The platen cover 5 is also provided so as to enable the platen cover 5 to be opened and closed, via a hinge 6, relative to the reading unit 3. Moreover, in the image forming apparatus 1, the reading unit 3 is not supported directly by the image recording unit 2, and the upper part of the device is supported via a support frame 7. The upper mechanism can be opened and closed by a hinge member 8 provided on the support frame 7. In addition, use of the support frame 7 can be applied to the image forming apparatus shown in FIG. 1, and it is an effective structure for relieving the impact on the lower part mechanism accompanied by the open/close operation of the upper mechanism and relieving the burden of the lower part mechanism, particularly in the case in which the upper mechanism having combination of the reading unit 3 and the platen cover 5 like the reading device having combination of the ADF and FBS is heavy.

Figure 6:
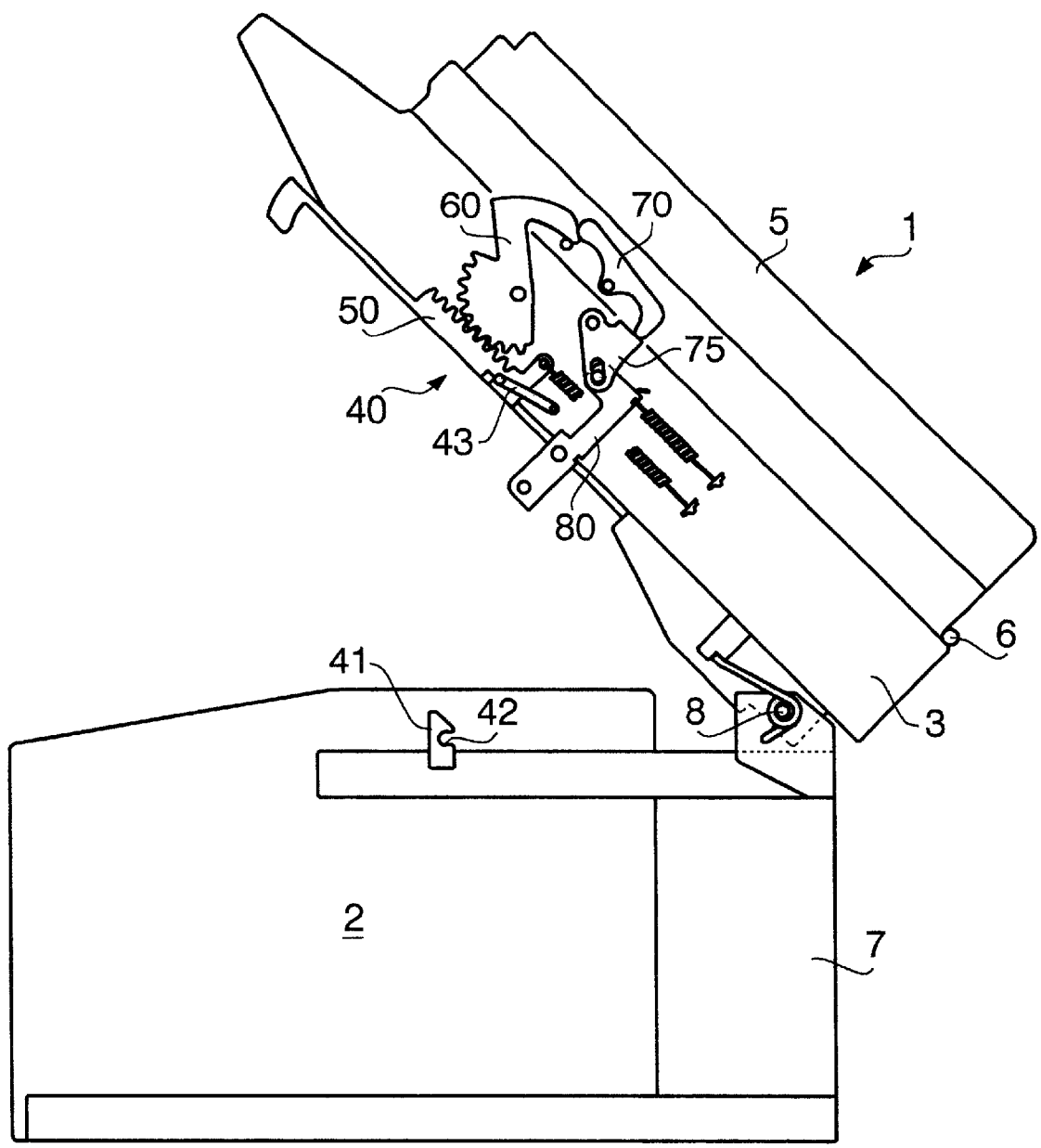
FIG. 6 is a side view showing an image forming apparatus according to another embodiment of the present invention in the state in which an upper mechanism is opened.
Figure 7:
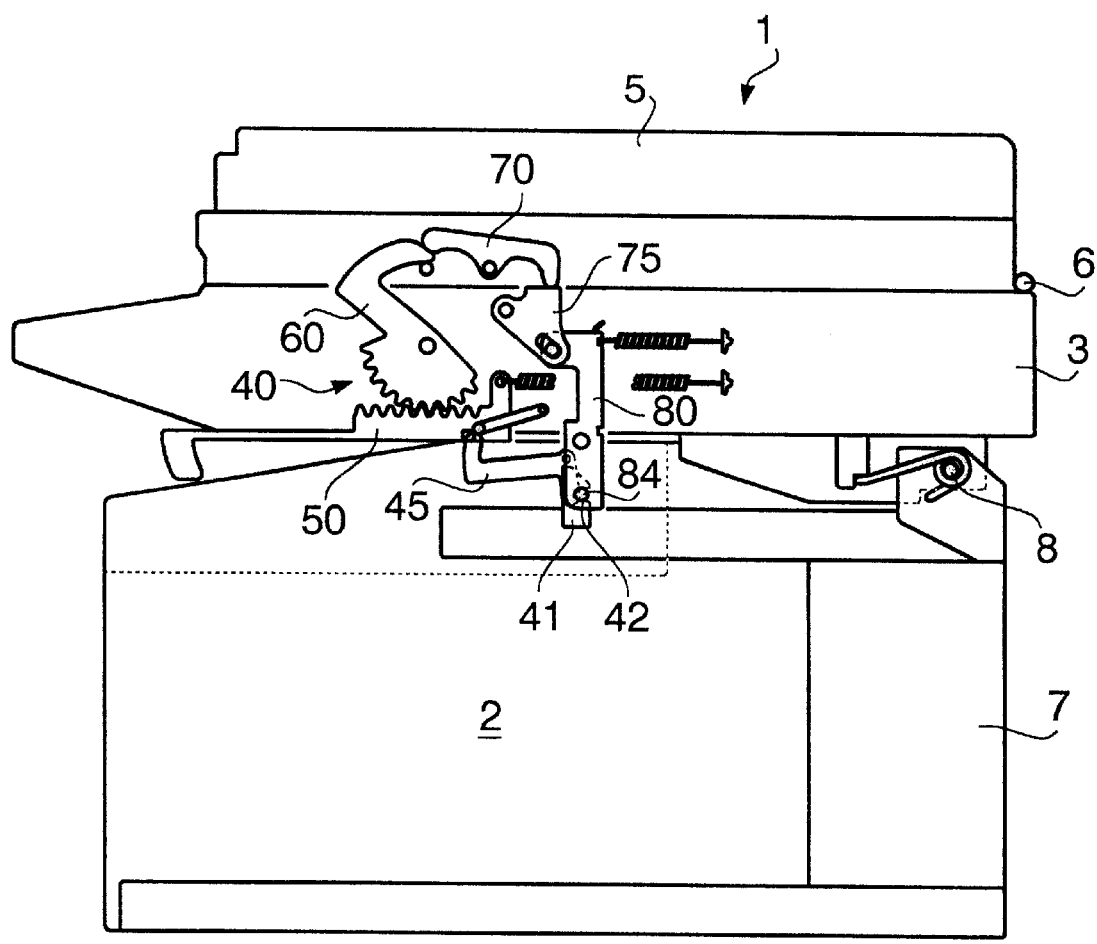
FIG. 7 is a side view showing the related movement of lock members of the image forming apparatus of FIG. 6 while an upper unit which is opened in FIG. 6 is being closed.
Figure 8:
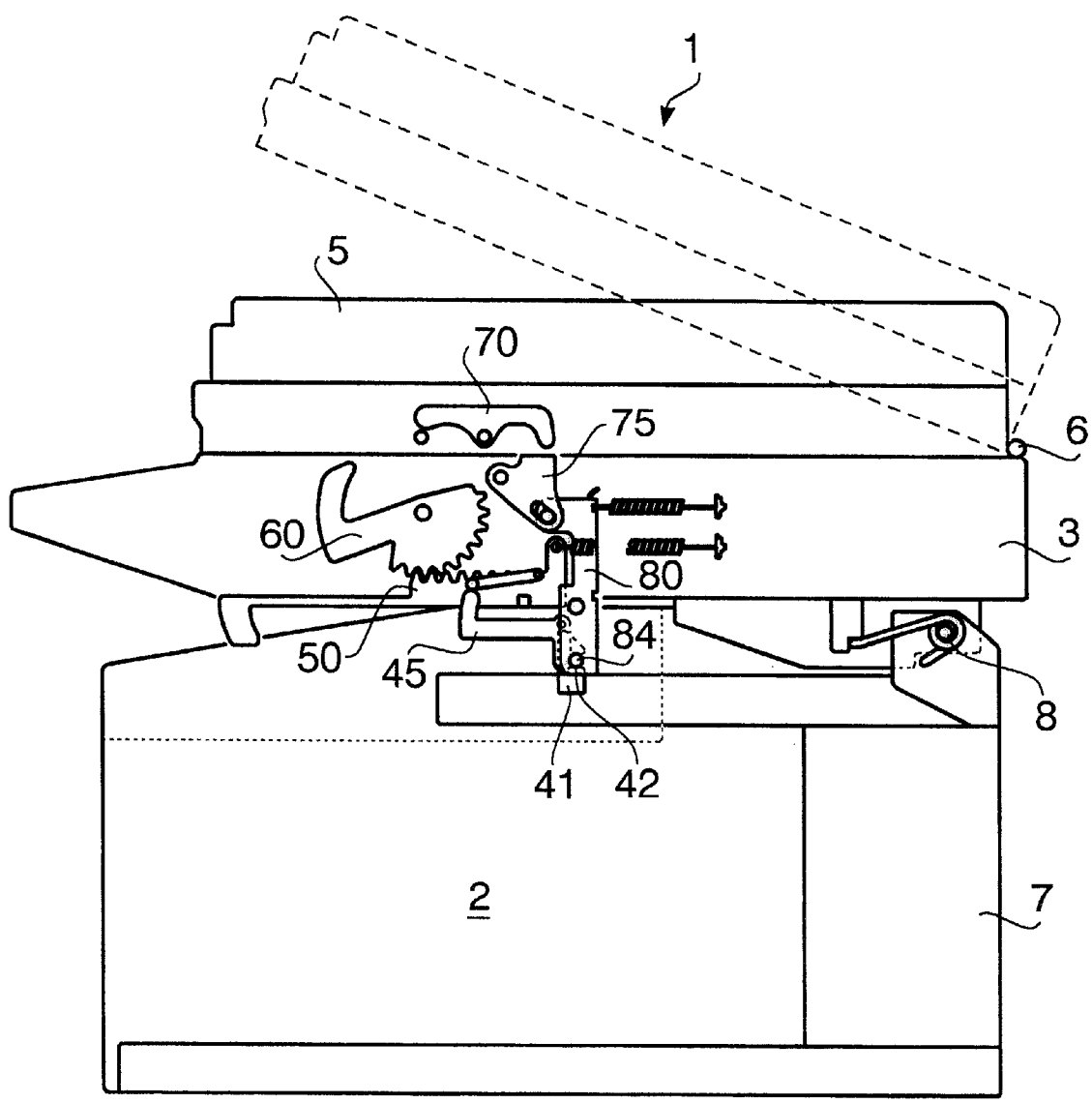
FIG. 8 is a side view showing the position relationship of an engagement retention mechanism of the image forming apparatus shown in FIG. 7 in the state in which the upper unit has been closed and a platen cover can be opened.

In examples shown in FIGS. 6 to 8, FIG. 6 shows the state in which the reading unit 3 is opened from the image recording unit 2 with the reading unit 3 combined with the platen cover 5. The upper surface of the image recording unit 2 can be open in doing an operation like maintenance of the image recording unit 2 from above. Moreover, an example shown in FIG. 7 shows the closing state of the reading unit 3 relative to the image recording unit 2, and the platen cover 5 can be opened by releasing the engaging to the platen cover 5 and the reading unit 3 is fixed and retained relative to the image recording unit 2 as shown in FIG. 8 after closing the reading unit 3.

An engagement retention mechanism 40 is provided in order to carry out fixing and releasing among the image recording unit 2, the reading unit 3 and the platen cover 5. The engagement retention mechanism 40 includes a body fixed hook 41 provided on the image recording unit 2, and a plurality of lever mechanisms provided on the reading unit 3. The engagement retention mechanism 40 is provided on the side of the image forming apparatus, and each component thereof is covered with a cover. Therefore, the engagement retention mechanism 40 is constructed as a mechanism that can be positioned close to, or contact with, a wall without exposing the mechanism in a side direction of the apparatus main body. Additionally, since only the handle 25 is exposed at the side part in the example of FIG. 1, only the space enough to operate the handle between the adjacent wall and the other member is sufficient.

Figure 9:
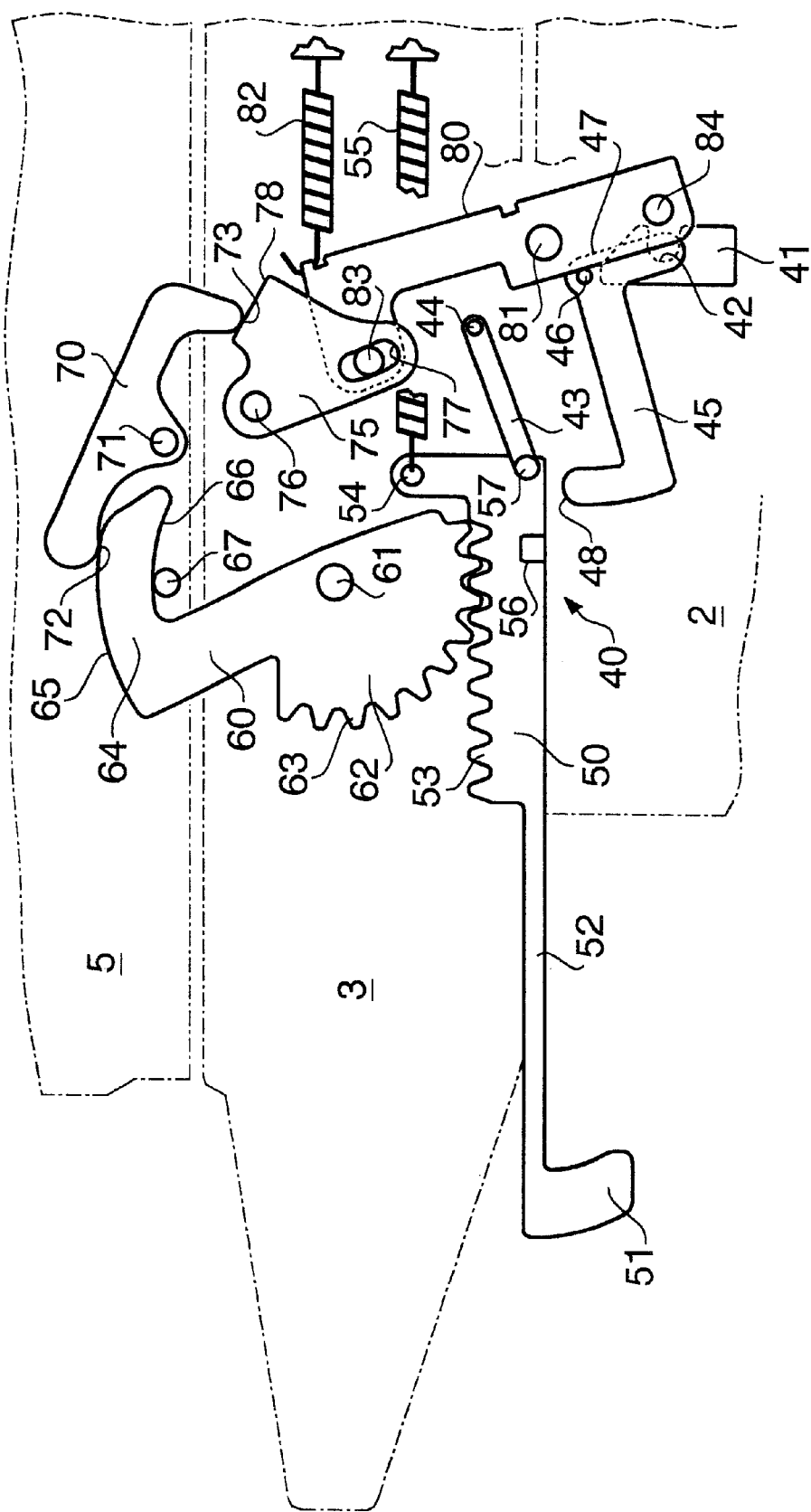
FIG. 9 is a side view showing the position relationship of each composition member of the engagement retention mechanism of FIG. 8, and corresponds to FIG. 6.
Figure 10:
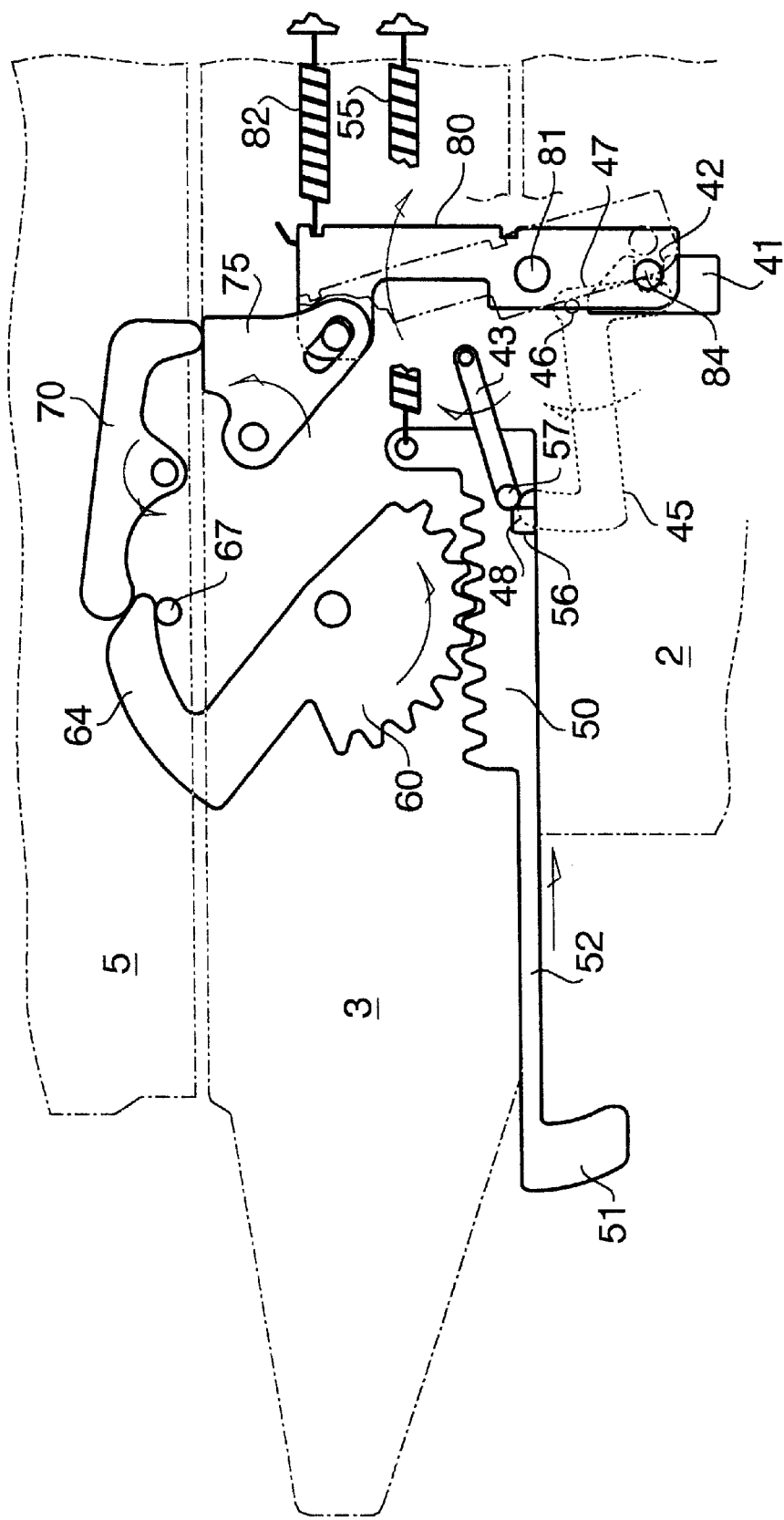
FIG. 10 is a side view showing the movement of each composition member of the engagement retention mechanism of FIG. 8, and corresponds to FIG. 7.
Figure 11:
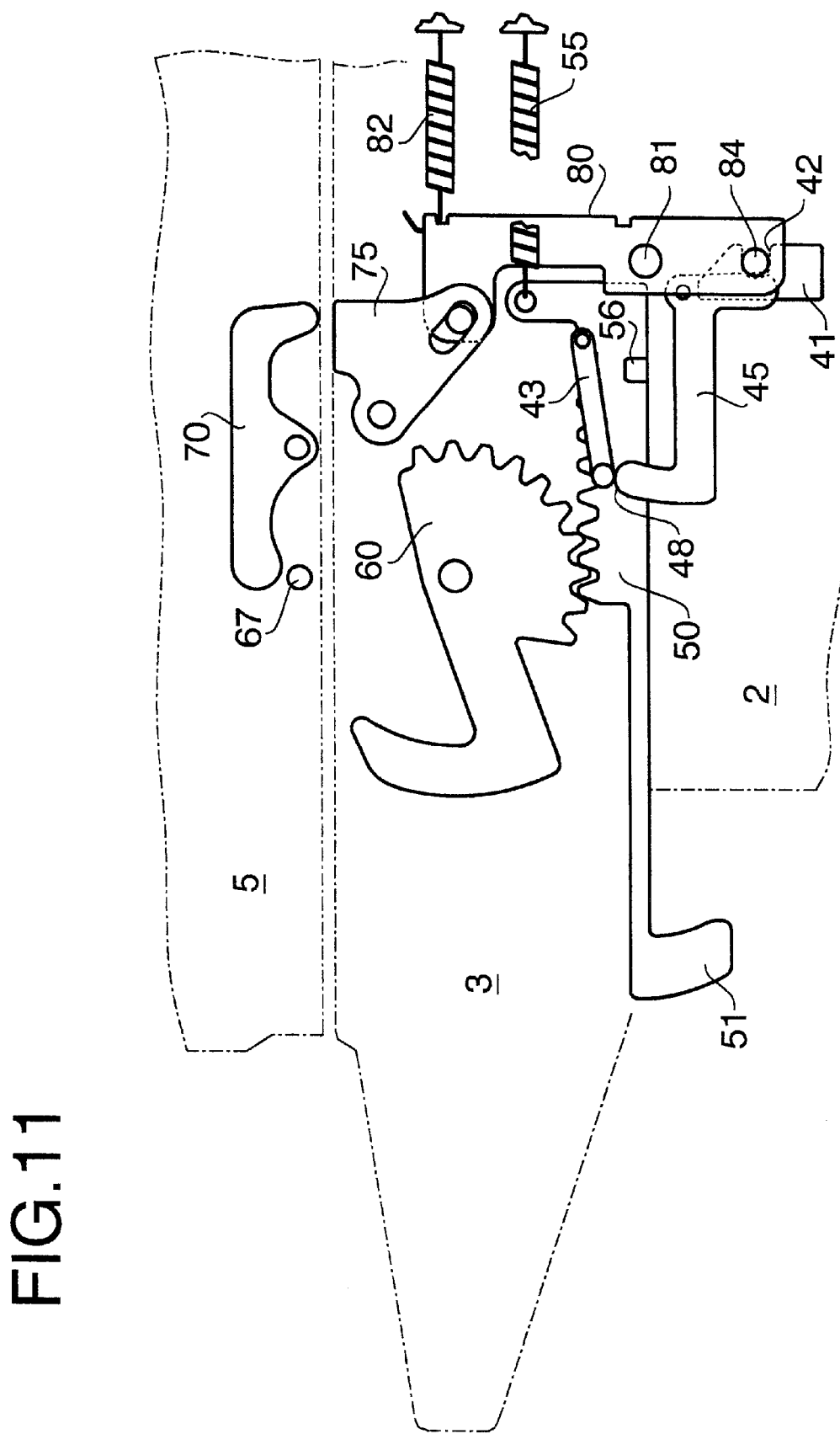
FIG. 11 is a side view showing the position relationship of each composition member of the engagement retention mechanism of FIG. 8, and corresponds to FIG. 8.

The structure of the engagement retention mechanism 40 and the operation of each composition member are shown in FIGS. 9 to 11. First, the members composing the engagement retention mechanism 40 will be described with reference to FIG. 9. As mentioned above, the body fixed hook 41 including a pin engagement groove 42 is fixed and disposed on the image recording unit 2. The body fixed hook 41 is provided as a member for engaging a engaged pin 84 of a lock lever 80. Moreover, the lock releasing mechanism for the second lock unit is composed by providing a release lever 45 swingably supported by a support shaft 46 in the vicinity of the body fixed hook 41. The release lever 45 is formed as an approximately crank-shaped member, and one end part of the release lever 45 is swung by the lock lever 80 having the engaged pin 84 engaged by the pin engagement groove 42. Accordingly, an upthrust part 48 at the tip of the upward arm part of the other end part of the release lever 45 performs the operation of swinging a stopper 43 via a support shaft 44. In addition, as described below, the reading unit 3 and the platen cover are held integrally, and can be opened and closed relative to the image recording unit 2 in the state in which a lock pin 57 provided at the tip part of the stopper 43 engages a engagement member 56 provided on a first lever 50.

The first lock unit includes a first lever member 50 as an operation lever on the reading unit 3, a second lever member 60 working with the movement of the first lever member 50, and a third lever member 70 provided on the platen cover 5, which are among respective components the engagement retention mechanism 40 comprises. Moreover, the second lock unit works with the first lock unit and releases the engagement between the reading unit 3 and the main body of the apparatus (the image recording unit 2). The second lock unit includes the lock lever 80 and the body fixed hook 41. The lock lever 80 is swung with a support shaft 81 functioning as a center via a forth lever 75 pushed by the third lever 70. The engaged pin 84 provided on the lock lever 80 are engaged with the image recording unit by the body fixed hook 41. The first lever 50 includes a handle 51 which is located at the tip of the handle lever 52, and which faces in a direction of the front part of the image forming apparatus, and which protrudes towards the lower side of the reading unit 3. Moreover, by pulling the first lever member 50 in a direction of the front part of the image forming apparatus, a rack 53 provided on the body of the lever is engaged with a pinion 63 of the second lever member 60, and the second lever member 60 is swung clockwise. Furthermore, the first lever member 50 is provided with a spring 55 via a pin 54 installed at the end part of the first lever member 50. The spring 55 carries out the operation of bringing back the first lever member 50 from the state in which the first lever member 50 has been.pulled to the front part of the image forming apparatus.

In the second lever member 60 working with the first lever member 50, a body 62 swingably supported by a support shaft 61 is formed into a shape having a part of the disk, and the pinion 63 is provided on the arc part. A key-shaped operation arc part 64 is provided in the protruding state from the main unit 62, and an upper part engagement surface 65 of the upper surface of the bending part of the operation lever part 64 is provided so as to correspond with a pushed part surface 72 of the third lever member 70, using a lower part engagement surface 66 of the lower surface of the bending part of the upper part of the operation lever 64 as the member engaging an engaging shaft 67 installed on the platen cover 5. By swinging the second lever member 60, the operation of engaging the platen cover 5 to the reading unit 3 is carried out. The operation of releasing the engagement of the of the, reading unit to the image recording unit 3 is carried out in accordance with the operation of engagement of the platen cover 5.

The third lever member 70 is swingably provided on the platen cover 5 via a support shaft 71. The pushed surface 72 corresponding with the upper part engagement surface 65 of the operation lever part 64 is provide on the one end of the third lever member 70, and the pushing part 73 is provided on the other end of the third lever member 70 so as to sag. The pushing part 73 of the third lever member 70 is provided so as to correspond with a pushed surface 78 of a forth lever member 75, and the forth lever member 75 is provided as a member for transmitting the movement of the third lever member 70 to the lock lever 80. When the pushed surface 72 of the third lever member 70 is pushed up by the operation lever part 64 of the second lever member 60, the pushing part 73, which is swung clockwise with the support shaft 71 functioning as a center to move downward centering the support shaft 71, pushes the pushed surface .78 of the fourth lever member 75. In addition, the forth lever member 75 is composed so as to swing with the fourth lever member supported by a support shaft 76, and supports an engaging pin 83 of the lock lever 80 with the engaging pin 83 movable relative to a long hole 77 provided on the lower part of the fourth lever member 75.

The lock lever 80 provided in the state in which the engaging pin 83 engages the long hole 77 of the forth lever member 75 is swingably supported by the support shaft 81, and is urged to swing clockwise via the support shaft 81 by providing a spring 82 on the upper side of the lock lever 80. Additionally, the engaging pin 83 connecting the forth lever member 75 and the lock lever 80 is supported, by the long hole, movably relative to the long hole 77 provided on the forth lever member 75. The size of the long hole 77 is formed with a moving distance of the engaging pin 83 relative to the long hole 77. The long hole 77 having this moving distance allows the forth lever members 75 and the lock lever 80 to swing relative to each other between the support shafts 76 and 81 which support the respective members.

Furthermore, an engagement pin 84 is provided on the lower end part of the lock lever 80, and the lock lever 80 is swung clockwise with the support shaft 81 functioning as a center in the state in which the reading unit 3 is-closed relative to the image recording unit 2. The engagement in the second lock unit is conducted by engaging the engagement pin 84 with the pin engagement groove 42 of the body fixed hook 41, and the side surface of the lock lever 80 pushes the pushed surface 47 of the release lever 45. The release lever 45 is swung clockwise centering the support shaft 46, and thereby the upthrust part 48 pushes up the stopper 43, and the operation of releasing the first lever member 50 engaged with the stopper 43 is performed.

In the engagement retention mechanism 40 including the above-mentioned members, an example of FIG. 9 shows that the second lever member 60 is swung and the engaging shaft 67 of the platen cover 5 becomes engaged by carrying out the operation of pulling the handle 51 of the first lever member 50 toward the front side of the apparatus so as to move the handle 51 to the first position, so that the reading unit 3 and the platen cover 5 are connected. Moreover, the engaging condition of the lock lever 80 to the image recording unit 2 is released by that the operation that the handle 51 of the first lever member 50 is pulled to the front side of the device again and it is moved to the second position and the third lever member 70, the forth lever member 75 and the lock lever 80 are worked together and swung sequentially working with the swing of the second lever member 60 and the engagement pin 84 provided in the lower end part of the lock lever 80 is departed from the engaging groove 42 of the main unit fix hook 41. In addition, as shown in FIG. 6, the reading unit 3 and the platen cover 5 are united and is arranged to be able to open from the image recording unit 2 by operating the engagement retention mechanism 40 as shown in FIG. 9.

When the operation of closing the reading unit 3 to the.image recording unit 2 is carried out from the state shown in FIG. 9, each composition member is moved from the state of FIG. 10 to the state of FIG. 11, the reading unit 3 is fixed and retained to the image recording unit 2, and the platen cover .5 can be opened and closed. The example of FIG. 10 shows the state in which the reading unit 3 is released from the image recording unit 2, and this example corresponds to FIG. 7. In this state, the first lever member 50 which was in the second position is pulled by the spring 55, and is fixed and held at the position where the lock pin 57 of the lever stopper 43 is engaged with the engagememt member 56. At this time, the platen cover 5 is held in an engaged state such that the platen cover 5 cannot be opened from the reading unit 3. Furthermore, when the first lever member 50 is moved a little innerward from the first position, the second lever member 60 is rotated, and the third lever member 70 comes to be in the state where the third lever member 70 is not pushed by the engagement surface 65 of the operation lever part 64. Therefore, the lock lever 80 is pulled by the spring 82 and is retained so as to protrude in the vertical direction against the line of the lower surface of the reading unit 3.

As mentioned above, in the state in which the lock lever 80 is retained in the approximately vertical direction relative to the line of the lower surface of the reading unit 3, the engagement pin 84 of the lock lever 80 is guided along the slanting part of the upper surface of the body fixed hook 41 by the operation of closing the reading unit 3, and the lock lever 80 is swung in a counterclockwise direction, centering the support shaft 81. In this manner, the lock lever 80 comes down to the position indicated by the dashed line of FIG. 10. Next, when the engagement pin 84 comes down to the entrance of the groove 42, the lock lever 80 is urged to rotate clockwise by the force of the spring 82, and the engagement pin 84 is inserted into the pin fixing groove 42. Accordingly, the pushed surface 47 of the release lever 45 is pushed by the engagement pin 84, and the release lever 45 is rotated clockwise, centering the support shaft 46. As a result, the upthrust part 48 of the release lever 45 pushes up the stopper 43, and the lock pin 57 of the stopper 43 is released from the engagement member 56 of the first lever member 50, so that the engagement of the first lever member 50 by the stopper 43 is released. Therefore, since the first lever member 50 engaged by the stopper 43 becomes free, the first lever member 50 is moved to the position shown in FIG. 11 by the elastic force of the spring 55, and the second lever member 60 is rotated in a counterclockwise direction, centering the support shaft 61 as shown in FIG. 10 by the movement of the first lever member 50. In addition, the engagement member 56 provided on the first lever 50, and the lock pin 57 provided on the stopper 43 can be members having any compositions, and can fix and retain the first lever member 50 at a prescribed position, and correctly follow the operation of opening and closing the reading unit 3.

Therefore, the engagement of the engaging shaft 67 by the operation lever part 64 and the pushing action to the third lever member 70 are stopped by the rotation of the second lever member 60. Accordingly, the forth lever member 75 pushed by the third lever member 70 becomes free, and the spring 82 of the lock lever 80 allows the lock lever 80 to rotate clockwise, centering the support shaft 81, and further the engagement pin 84 is entered into the pin groove 42 of the body fixed hook 41. As mentioned above, each composition member of the engagement retention mechanism 40 is operated in the state in which the reading unit 3 is closed to the image recording unit 2. In this manner, the engagement pin 84 of the lock lever 80 is engaged with the body fixed hook 41, the fixing between two units are done, and the platen cover 5 is set to be openable and closable freely as shown in FIG. 11. In the state in which the engagement retention mechanism 40 is positioned as shown in FIG. 11, since the platen cover 5 can be opened and closed as indicated by the dashed line of FIG. 8, a sheet-type or book-type document is set on the platen glass (not shown in the drawings) provided on the upper surface of the reading unit, and thereby the reading operation of the document can be carried out.

When some trouble happens to the image recording unit 2 and the maintenance of the image recording unit 2 is needed in the state in which each composition member composing the engagement retention mechanism 40 is positioned as shown in FIG. 11 and in which an image of the document set on the reading unit 3 is being read, the engagement retention mechanism 40 is operated by using the first lever member 50 as shown in FIG. 9, and the engagement pin 84 of the lock lever 80 is released from the body fixed hook 41 provided on the image recording unit 2. In this manner, as shown in FIG. 6, the reading unit 3 and the platen cover 5 can be opened from the image recording unit 2 with the reading unit 3 and the platen cover 5 connected to each other.

Additionally, in each embodiment, for example, the second lever member 60 is rotated when pulling the handle 51 of the first lever member 50 with the platen cover 5 opened. However, since the third lever member 70 is not swung by contacting with the lever part 64 of the second lever member with the platen cover 5 opened, the engaged state by the lock lever 80 is not released. Therefore, since the platen cover 5 must be closed when trying to open the reading unit 3, the state in which the reading unit 3 is engaged with the main body on which the image recording unit 2 is provided cannot be released when the platen cover 5 is open. As a result, when the reading unit 3 is opened from the main unit 2, the inconvenience that the platen cover 5 is opened widely can be prevented from occurring by using the engagement retention mechanism 40, and all of a jam eliminating process and a maintenance process can be conducted from the front surface side of the apparatus, and the safety of the platen cover can be secured.

The image forming apparatus 1 comprising the operation mechanism as shown in the each embodiment can be composed as an apparatus that is combination of a copying machine and a facsimile device, other than an electrophotographic copying machine and a facsimile device. When the image forming apparatus is composed as a composite machine, the image data read by the reading unit is transmitted as a digital signal by using a telephone line. Moreover, in the case of use as the electrophotographic copying machine, recording is carried out on a recording medium by the image recording unit 2 using the digital signal as the image data obtained by the reading unit. However, in the image recording unit 2, recording on a recording medium by using the signal received by the facsimile is carried out in the same manner as the conventional general composite machine. In addition, the reading unit 3 and the platen cover 5 which can be opened and closed in the same direction are described in the embodiments of the present invention. However, it will be obvious to those skilled in the art that various changes may be made without departing from the scope of the present invention.

As the image forming apparatus according to the embodiments of the present invention is composed as described above, one example of the image forming apparatus has the first lock unit enabling the platen cover to be locked to the reading unit with the platen cover closed, and the second lock unit for releasing the connection of the reading unit and the main body of the apparatus by interlocking with the first lock unit. Therefore, the damage of the platen cover can be prevented because the platen cover is locked to the reading unit and the platen cover is not opened with the platen cover widely swung at the time the process unit provided on the main body of the apparatus is exchanged and the reading unit is swung for eliminating the recording paper jam in the recording part.

In another example of the image forming apparatus, the first lock unit is composed so as to operate the first lock unit to move it to the first position where the platen cover is locked to the reading unit and to move it to the second position where the second lock unit is activated. Therefore, the first lock unit carries out the operation of releasing the lock between the main body of the apparatus and the reading unit by fixing the platen cover and by interlocking respective composition members, so that the operation can be easily carried out by one operation of the first lock unit.

In another example of the image forming apparatus, the first lock unit has the first lock member freely rotatably provided on the platen cover, and the lever for rotating the first lock member, so that the structure of the mechanism can be simpler by providing the lever on the first lock member and the operation member corresponding to the second lock unit.

In another example of the image forming apparatus, the second lock unit restraining the first lock unit has the link whose one end is rotatably supported, and which includes the engagement part at the other .end thereof for engaging the engagement part of the main body of the apparatus. The reading unit is released by the contact between the first lock member and the link, so that the platen cover can be opened in the state in which the reading unit is closed to the main body of the apparatus, and thereby the platen cover can be retained safely.

Another example of the image forming apparatus has the operation lever that can move the first lock unit to the first position and the second position, and the stopper that stops the operation lever at the first position after the operation lever, is moved to the second position. The first lock unit includes the first lock member rotatably installed on the reading unit and interlocked by the operation of the operation lever, and the engagement part engaging with the first lock member of the platen cover. Therefore, the -connection between the reading unit and the platen cover is retained while working is under way with the recording part exposed. Furthermore, the opening and closing of the platen cover can be permitted only in the state in which the reading unit is fixed correctly to the main body of the apparatus.

In another example of the image forming apparatus, the second lock unit has the second lock member installed on the reading unit and interlocked by the first lock member through the link mechanism, and the engagement part installed on the main body of the apparatus for engaging the second lock member. Therefore, the second lock unit is operated by the first lock unit, and the opening and closing of the reading unit can be carried out relative to the main body of the apparatus.

Another example of the image forming apparatus has the stopper releasing member for releasing the engagement between the operation lever and the lever stopper for stopping the operation lever at the first position. This engagement is released when the reading unit provided on the upper side of the main body of the image forming apparatus is closed. Therefore, the lever stopper locking the operation lever is released when closing the reading unit to the main body, so that the first lock member which is in the waiting position can be released from the engaged state via the interlocking mechanism, and the state enabling opening and closing of the platen cover can be easily made.

What is claimed is:

1. An image forming apparatus comprising:
    a reading unit openably and closably provided on a main body of the image forming apparatus;
    a platen cover openably and closably provided on the reading unit;
    a first lock unit which enables the platen cover to be locked to the reading unit; and
    a second lock unit which enables the reading unit to be locked to the main body of the apparatus, and which is arranged to be interlocked with said first lock unit.

2. The image forming apparatus according to claim 1, wherein said first lock unit enables the platen cover to be locked to the reading unit with the platen cover closed, and said second lock unit releases connection between the reading unit and the main body in conjunction with said first lock unit.

3. The image forming apparatus according to claim 2, wherein the first lock unit includes a first lock member rotatably provided on the platen cover, and a lever for rotating the first lock member.

4. The image forming apparatus according to claim 3, wherein the second lock unit restrains the first lock unit, and includes a link whose one end is rotatably supported by a shaft and which has an engagement part provided on the other end of the link for engaging with an engagement part provided on the main body,
    wherein by making the first lock member contact against the link, engagement between the main body and the reading unit is released.

5. The image forming apparatus according to claim 3,
    wherein the reading unit includes an engaging part for engaging the first lock member in order to lock the platen cover to the reading unit,
    wherein the image forming apparatus further includes a stopper for engaging the first lock member in order to stop the first lock member at a first position where the platen cover is locked to the reading unit, and a stopper releasing member for releasing engagement between the stopper and the first lock member when the reading unit is closed.

6. The image forming apparatus according to claim 2, further including an operation lever which can operate the first lock unit to a first position where the platen cover is locked to the reading unit and to a second position where the second lock unit is activated, and a stopper for stopping the operation lever at the first position after the operation lever is operated to the second position,
    wherein the first lock unit includes a first lock member which is rotatably provided on the reading unit and which is rotated by interlocking with operation of the operation lever, and an engaging part provided on the platen cover for engaging the first lock member.

7. The image forming apparatus according to claim 6,
    wherein the second lock unit includes a second lock member provided on the reading unit for interlocking with the first lock member via a link mechanism, and an engagement part provided on the main body for engaging the second lock member.

8. The image forming apparatus according to claim 6, further including a stopper releasing member for releasing engagement between the stopper and the operation lever when the reading unit is closed.

9. The image forming apparatus according to claim 2, wherein the platen cover is opened and closed in the same direction as the reading unit is opened and closed.

10. The image forming apparatus according to claim 1, wherein the first lock unit is arranged for the platen cover to be locked to the reading unit when the second lock unit releases connection between the reading unit and the main body of the apparatus.

11. The image forming apparatus according to claim 10, wherein the first lock unit is operated to a first position where the platen cover is locked to the reading unit, and to a second position where the second lock unit is activated.

12. The image forming apparatus according to claim 10, wherein the first lock unit includes a first lock member rotatably provided on the platen cover, and a lever for rotating the first lock member.

13. The image forming apparatus according to claim 12, wherein the second lock unit restrains the first lock unit, and includes a link whose one end is rotatably supported by a shaft and which has an engagement part provided on the other end of the link for engaging with an engagement part provided on the main body,
    wherein by making the first lock member contact against the link, engagement between the main body and the reading unit is released.

14. The image forming apparatus according to claim 12,
    wherein the reading unit includes an engaging part for engaging the first lock member in order to lock the platen cover to the reading unit,
    wherein the image forming apparatus further includes a stopper for engaging the first lock member in order to stop the first lock member at a first position where the platen cover is locked to the reading unit, and a stopper releasing member for releasing engagement between the stopper and the first lock member when the reading unit is closed.

15. The image forming apparatus according to claim 10, further including an operation lever which can operate the first lock unit to a first position where the platen cover is locked to the reading unit and to a second position where the second lock unit is activated, and a stopper for stopping the operation lever at the first position after the operation lever is operated to the second position,
    wherein the first lock unit includes a first lock member which is rotatably provided on the reading unit and which is rotated by interlocking with operation of the operation lever, and an engaging part provided on the platen cover for engaging the first lock member.

16. The image forming apparatus according to claim 15,
    wherein the second lock unit includes a second lock member provided on the reading unit for interlocking with the first lock member via a link mechanism, and an engagement part provided on the main body for engaging the second lock member.

17. The image forming apparatus according to claim 15, further including a stopper releasing member for releasing engagement between the stopper and the operation lever when the reading unit is closed.

18. The image forming apparatus according to claim 10, wherein the platen cover is opened and closed in the same direction as the reading unit is opened and closed.

19. An image forming apparatus, comprising:

a reading unit openably and closably provided on a main body of the image forming apparatus;

a platen cover openably and closably provided on the reading unit;

a first lock unit for enabling the platen cover to be locked to the reading unit, with the platen cover closed; and a second lock unit for interlocking with the first lock unit, wherein the main body includes a body fixed hook, and a groove formed on the body fixed hook, wherein the second lock unit includes a lateral link movably provided on the reading unit and having a pin on one end of the lateral link, and first urging means for urging the lateral link to move in a direction of inserting the pin into the groove when the reading unit is closed, wherein the first lock unit includes a swinging lever, rotatably provided on the platen cover, for pushing the lateral link against the first urging means in a direction of releasing the pin from the groove and simultaneously engaging a part of the reading unit, wherein the reading unit includes a stopper, rotatably provided on the reading unit, for preventing the swinging lever from being released from the part of the reading unit when the reading unit is opened from the main body, wherein the body fixed hook includes an engaging member for rotating, by contacting against one end of the stopper when the reading unit is closed to the main body, the stopper in a direction of enabling the swinging lever to be released from the part of the reading unit.

20. An image forming apparatus, comprising:

a reading unit openably and closably provided on a main body of the image forming apparatus;

a platen cover openably and closably provided on the reading unit;

a first lock unit for enabling the platen cover to be locked to the reading unit, with the platen cover closed; and a second lock unit for interlocking with the first lock unit, wherein the first lock unit includes a first lever member, a second lever member rotatably provided on the reading unit for engaging with a part of the platen cover in order to lock the platen cover to the reading unit, and a third lever member rotatably provided on the platen cover, wherein the second lock unit includes a lock lever rotatably provided on the reading unit and having a pin on one end of the lock lever, and a body fixed hook provided on the main body and having a groove for engaging the pin, wherein if the reading unit is closed to the main body, when the first lever member is pushed in an outer direction of the image forming apparatus, the first lever member rotates the second lever member in a direction of making the second lever member engage with the part of the platen cover, the second lever member rotates the third lever member, and the third lever member rotates the lock lever in a direction of releasing the pin from the groove, wherein if the reading unit is closed to the main body, when the first lever member is pushed in an inner direction of the image forming apparatus, the first lever member rotates the second lever member in a direction of releasing engagement between the second lever member and the part of the platen cover, and the lock lever becomes able to rotate, by interlocking with the first lever member, the second lever member, and the third lever member, in a direction of enabling the pin to be inserted into the groove, wherein the reading unit includes a stopper for preventing the engagement between the second lever member and the part of the platen cover from being released when the reading unit is opened from the main body, and means for urging the pin to be inserted into the groove when the reading unit is closed to the main body.

* * * * *